UNITED STATES PATENT OFFICE.

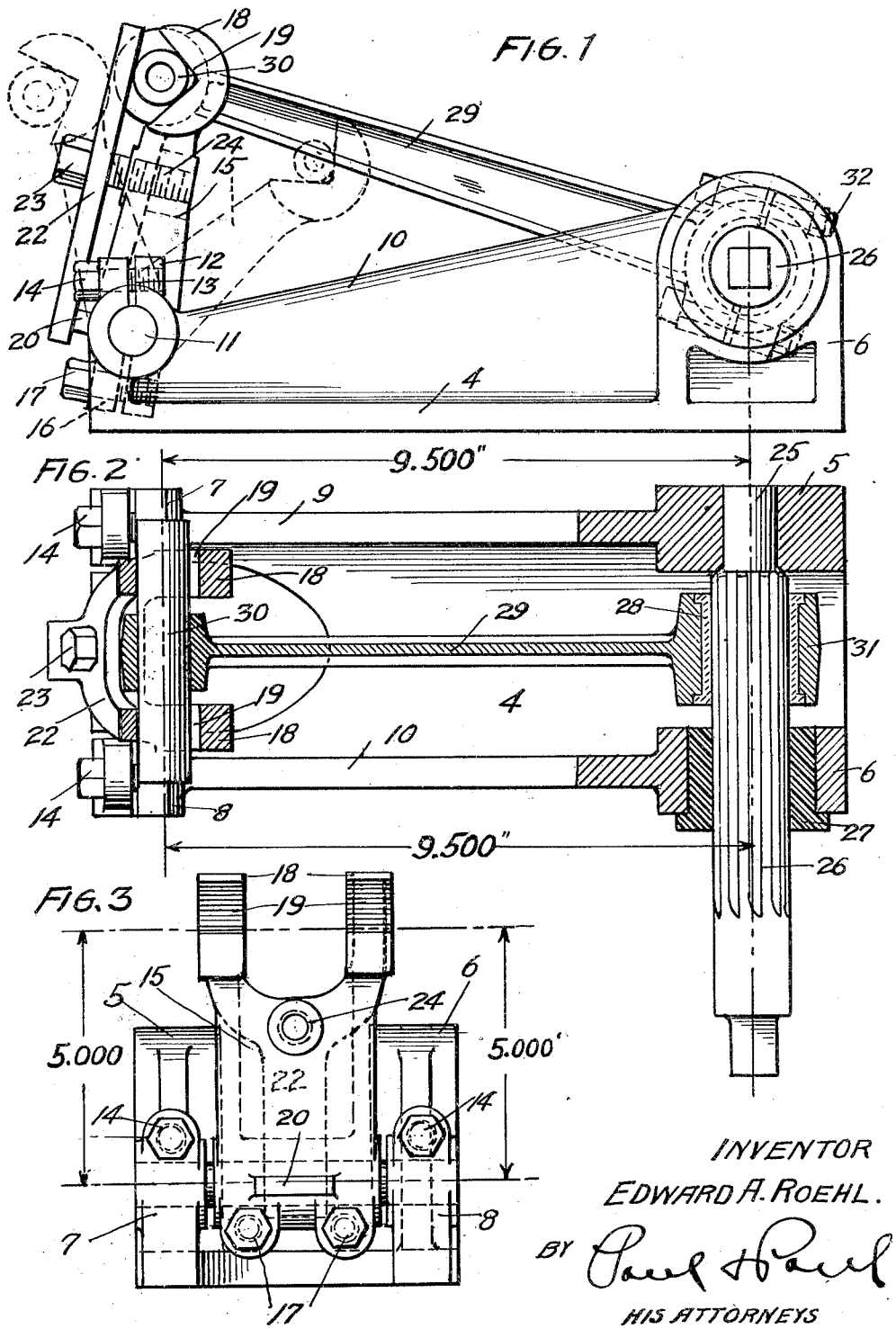

EDWARD A. ROEHL, OF MINNEAPOLIS, MINNESOTA.

PARALLEL-ALINEMENT FIXTURE.

1,369,472.  Specification of Letters Patent.  Patented Feb. 22, 1921.

Application filed March 20, 1920. Serial No. 367,461.

*To all whom it may concern:*

Be it known that I, EDWARD A. ROEHL, a citizen of the United States, resident of Minneapolis, county of Hennepin, State of Minnesota, have invented certain new and useful Improvements in Parallel-Alinement Fixtures, of which the following is a specification.

My invention relates to fixtures for the parallel alinement of the axial centers of cylindrical bores, pins or shafts located in a common body and is especially designed for accurately alining or paralleling the connecting rod bearings with the wrist or piston pin of internal combustion engines or similar machines.

The object of the invention is to provide a device whereby the crank pin and wrist bearings of connecting rods of various lengths and sizes may be quickly and accurately restored to normal alinement after having been disarranged as by wear or accidental bending or twisting of the connecting rod or when after rebabbitting or relining the bearings the alinement is uncertain or has been destroyed. Heretofore it has been the usage in such cases to first repair or renew the bearings independent of each other and then attempt to bring the bearings parallel by bending or twisting the rod to the true position. It has been found very difficult if not impossible to get accurate alinement of the bearings by this method and I therefore propose to reverse the process by first restoring or straightening the connecting rod to about normal if it has been bent or otherwise brought out of a true condition, and then by the use of my device quickly and positively ream the crank pin bearing absolutely true to and parallel with the wrist pin.

My invention consists in certain constructions and combinations, all as hereinafter described and particularly pointed out in the claims, taken in connection with the accompanying drawings forming a part of this specification, in which—

Figure 1 is a side elevation of a fixture embodying my invention and illustrating its application with a connecting rod.

Fig. 2 is a plan sectional view on the line 2—2 of Fig. 1.

Fig. 3 is an end elevation of the fixture with the connecting rod removed.

In the drawings 4 is the base plate of the frame of the alinement fixtures, having forward upwardly extending paralleling blocks 5 and 6 and somewhat smaller and lower rear clamping blocks 7 and 8. Integral tapering ribs 9 and 10 connecting the clamping and paralleling blocks, form the frame into a rigid permanent structure of a one piece casting. The clamping blocks 7 and 8 are accurately bored to receive a transverse circular pin 11 and the clamping lugs 12 of the blocks are split at 13 by means of which the pin 11 may be securely clamped against rotation in the blocks by screws or bolts 14. An upwardly extending arm 15 being accurately bored to fit the pin 11, is mounted on the pin between the clamping blocks 7 and 8 and is provided with split clamping lugs 16 having clamping screws 17 by which the arm may be secured firmly to the pin 11. The upper end of the arm 15 is forked and in each fork member 18 is machined a V groove 19 with walls exactly in parallel alinement with the axis of the pin 11. A lug 20 is provided on the arm 15 and a forked clamping bar 22 is normally supported on a clamping screw 23, having threaded connections at 24 with the arm 15, the lower end of the bar 22 resting against the lug 20. The paralleling blocks 5 and 6 are bored exactly in parallel alinement with the bore in the clamping blocks 7 and 8, the bore in the block 5 being preferably of smaller diameter than the bore in the block 6 to accurately fit the shank 25 of a reamer 26. The larger bore of the block 6 is provided with a hardened steel bushing 27 having an internal bore to accurately fit the main body of the reamer 26. The bushing 27 is removable and bushings of different internal bores may be substituted for use with different size reamers.

In practice when the crank pin bearing 28 on a connecting rod 29 is to be trued up to exact parallel alinement with the wrist pin 30, the proper size bushing corresponding to the diameter of the crank pin, is first inserted in the block 6 and the exact size reamer inserted through the bushing 27, the shank of the reamer fitting in the block 5 as shown in Fig. 2. The cap 31 of the connecting rod, having been removed and the wrist pin 30 having been securely fastened to the connecting rod by the usual means, the wrist pin is placed in the V groove 19, the rod extending toward the paralleling blocks 5 and 6. The clamping screws 14 or 17 are then loosened sufficiently so that the arm can be swung backward or forward according to the length of the connecting rod as indicated by dotted lines in Fig. 1, to bring the crank pin bearing 28 snugly against the reamer 26. The cap 31 is then replaced and clamped firmly against the reamer 26 by means of the connecting rod cap screws or bolts 32. The wrist pin 30 is then clamped firmly against the walls of the V groove 19 by means of the clamping bar 22, lug 20 and clamping screws 23 after which the arm 15 is securely locked in place by the clamping screws 14 or 17. The reamer 26 may now be turned to cut itself free in the crank pin bearing and if the bearing should then not be true over its entire surface the cap 31 may again be clamped tight against the bearing for another cut of the reamer and this operation may be repeated until the entire bearing surface is perfectly true and exactly parallel in all respects with the wrist pin 30. The numbers 9.500 and 5.000 in Figs. 2 and 3 of the drawings indicate the absolute parallelism in all planes of the bearing 28 with the wrist pin 30 when being treated by this method. It will also be noted that all practical lengths of connecting rods and diameters of bearings and wrist pins can be accommodated in the same fixture, that to change the fixture from one to another size of rod as well as the operation of the device is easily and quickly performed and that the fixture is extremely reliable and accurate and simple of construction.

Various modifications in the details of construction may of course be made without departing from the principle or scope of the invention and I do not therefore confine myself strictly to the details of construction as shown.

I claim as my invention:

1. A fixture for paralleling the crank pin bearings and wrist pin of a connecting rod, comprising a frame having two annular apertures in axial line to receive and guide a rotary cutting tool for said bearing and a pin mounted in said frame universally parallel to the axial line of said apertures, an arm swingingly mounted on said pin, said arm having V grooves universally parallel to said pin, for receiving the opposite ends of a wrist pin and clamping elements for securing the wrist pin in said V grooves parallel to the axial line of said apertures.

2. In a fixture for paralleling the crank pin bearings and wrist pin of a connecting rod, the combination with a frame having two pairs of upwardly extending lugs axially alined apertures in one pair of lugs to receive and guide a rotary cutting tool, a pin universally parallel with the axial line of said aperture, mounted in the other pair of lugs, an arm swingingly mounted on said pin, said arm having bearings universally parallel to said pin, for receiving the opposite ends of a wrist pin, and clamping elements for securing the wrist pin in said bearings at a point from said apertures predetermined by the length of the connecting rod.

In witness whereof, I have hereunto set my hand this 17" day of March 1920.

EDWARD A. ROEHL.